(12) United States Patent
Maahs (10) Patent No.: US 8,056,424 B2
(45) Date of Patent: Nov. 15, 2011

(54) MULTI-CHANNEL FLOW SENSOR WITH EXTENDED FLOW RANGE AND FASTER RESPONSE

(75) Inventor: Michael David Maahs, Dallas, TX (US)

(73) Assignees: Sean P. Palacios, Rockville, MD (US); Michael David Maahs, Dallas, TX (US)

( * ) Notice: Subject to any disclaimer, the term of this patent is extended or adjusted under 35 U.S.C. 154(b) by 72 days.

(21) Appl. No.: 12/561,290

(22) Filed: Sep. 17, 2009

(65) Prior Publication Data

US 2011/0061469 A1    Mar. 17, 2011

(51) Int. Cl.
*G01F 1/32*    (2006.01)

(52) U.S. Cl. .................................................. 73/861.22

(58) Field of Classification Search ............. 73/861.22, 73/861.24, 861.23, 861.34; 702/45
See application file for complete search history.

(56) References Cited

U.S. PATENT DOCUMENTS

| | | | |
|---|---|---|---|
| 3,589,185 A | 6/1971 | Burgess | |
| 3,824,853 A | 7/1974 | Mahon | |
| 3,867,839 A | 2/1975 | Herzl | |
| 4,228,768 A | 10/1980 | Kita | |
| 4,392,385 A | 7/1983 | Okuda et al. | |
| 4,478,087 A | 10/1984 | Asayama | |
| 4,589,279 A | 5/1986 | Mitsuyasu et al. | |
| 4,696,193 A | 9/1987 | Nanba et al. | |
| 4,716,770 A | 1/1988 | Herzog | |
| 4,815,324 A | 3/1989 | Tada et al. | |
| 4,819,490 A | 4/1989 | Isobe et al. | |
| 4,850,218 A | 7/1989 | Tutumi | |
| 5,005,427 A | 4/1991 | Ohmae | |
| 5,383,356 A | 1/1995 | Zurek et al. | |
| 5,398,548 A | 3/1995 | Ono | |
| 5,476,012 A | 12/1995 | Takashima | |
| 5,614,681 A | 3/1997 | Tada | |
| 5,708,214 A | 1/1998 | Kiguchi | |
| 5,908,991 A | 6/1999 | Sasaki et al. | |
| 2002/0129661 A1* | 9/2002 | Clarke et al. | 73/861.22 |
| 2005/0273278 A1* | 12/2005 | Sprague | 702/45 |
| 2006/0089803 A1* | 4/2006 | Lei et al. | 702/1 |
| 2008/0048455 A1* | 2/2008 | Carney | 290/54 |
| 2009/0013867 A1* | 1/2009 | McCutchen | 95/35 |

FOREIGN PATENT DOCUMENTS

| WO | 2008/076346 | * | 6/2008 |
|---|---|---|---|
| WO | 2008076346 A2 | | 6/2008 |

OTHER PUBLICATIONS

International Search Report and Written Opinion in counterpart International Application No. PCT/US2010/049214, mailed Nov. 15, 2010.
"Preventing Fugitive Emissions With Vortex Flowmeters," http://www.yokogawa.com/fld/fld-dyf-01en.htm; 2007, Yokogawa Electric Corporation.
"Electronic Flowmeters," Flow & Level Measurement, Transactions vol. 4, pp. 1-19, 2001.
Sheryll Goecke Powers, "Flight Tests of External Modifications Used to Reduce Blunt Base Drag," NASA Technical Memorandum 100433, Jun. 1988.

* cited by examiner

*Primary Examiner* — Jewel V Thompson
(74) *Attorney, Agent, or Firm* — Edell, Shapiro & Finnan, LLC (57) ABSTRACT

A fluid flow device having a vortex generator in two or more channels, each channel having a section to scale the flow velocity to a desirable range of Reynolds number, and vortex shedding and/or vortex passing frequency. Said flow device may be used as a flow meter by measuring the vortex shedding/passing frequency from each vortex generator. Further improvement is had by selecting the highest usable frequency, with its corresponding scaling factor, as the most-precise and fastest-response measurement output of the flow-measuring device. Still further improvement is obtained by cross-checking all usable frequencies against each other to detect failure of one or more vortex shedding/passing sensors.

32 Claims, 13 Drawing Sheets

MULTI-CHANNEL FLOW SENSOR WITH EXTENDED FLOW RANGE AND FASTER RESPONSE

BACKGROUND

Sensing fluid flow using vortex street generation is simple, inexpensive, and robust, but it suffers from limitations in range of flow velocities; it also suffers from slow response and relatively large measurement error at low flow velocities.

Scaling the fluid flow velocity by using converging and/or diverging channels adjusts the flow velocity to a range suitable for production of measurable vortex streets.

Multiple channels with different velocity scalings for different vortex sensors greatly extends the usable range of the vortex sensor method by choosing the most-sensitive sensor which has not saturated (exceeded its maximum sensible flow velocity). Sensors in the same assembly, having fluid flows exceeding their ability to respond, are not damaged due to the rugged nature of the basic method. Using the most-sensitive sensor that has not saturated reduces both measurement error and measurement time; reduced measurement time speeds response to a change in flow rate.

Another improvement is using multiple channels with bluff bodies of differing widths or shapes to produce multiple vortex frequencies from the same flow. This provides extends the range of sensible vortex streets. This method can also be combined using different channel flow velocity scalings as desired.

Vortex flow meters are easily linearized and are very robust. They compete with methods such as hot-wire, hot-film, and moving-vane meters; these other methods have had greater dynamic range or speed-of-response, but are not as reliable and robust. Methods described here improve vortex flow meters' response characteristics to meet or exceed those of competing methods, while maintaining the robust and low-cost advantages of the vortex method.

Vortex flow meters are very commonly used to sense airflow into internal combustion engines, but they have applications in metering fluids in a wide variety of settings. They can also be used to measure coolant, lubricating oil, and fuel flow in engines. Vortex flow meters can be used to meter combustion or ventilation airflow in HVAC units (which currently use moving-vane detectors). They have also found applications in pipelines carrying diverse fluids such as water, natural gas, and other fuels.

Vortex flow meters, when used in piston engine intakes, frequently save significant fuel due to their excellent reliability as competing types of flowmeters frequently age and fail in ways that cause excess fuel to be metered out by the engine controller.

BRIEF DESCRIPTION OF THE DRAWINGS

The features and advantages of multi-channel vortex generators in a converged fluid flow of the present disclosure will become apparent upon consideration of the following description of example embodiments thereof, particularly when taken in conjunction with the accompanying drawings wherein like reference numerals in the various figures are utilized to designate like components.

DESCRIPTION OF EXAMPLE EMBODIMENTS

Overview

Techniques are provided herein to generating a fluid flow in a first channel, passing the fluid flow through a first nozzle to a second channel, where the cross-sectional area of the second channel is different from the cross-sectional area of the first channel, and generating a first Kármán vortex street in the second channel. A second aspect of the present invention generates a second Kármán vortex street in the first channel. Other aspects of the present invention generate vortex streets in fluid flows converged in various convergence/divergence ratios (nozzle ratios). The fluid flow may be separated into various channels prior to convergeance/divergence. Thus, a plurality of vortex streets may be generated in series within the fluid flow, in parallel via two or more fluid flows created by separating the fluid flow, or in any combination of serial or parallel thereof.

The present invention adjusts the flow velocity in at least one channel to optimize the range of vortex passing frequency and Reynolds number. The invention then further produces two or more channels that scale the flow in two or more different ways, to provide an overlapping response with different scaling factors. This allows the rugged and inexpensive vortex flowmeter method to exhibit the same or greater range of response with the same or better error characteristics, as the competing flowmeter methods. All this is achieved without introducing any of the failure modes that afflict competing flowmeter methods.

Example Embodiments

Figure 1:
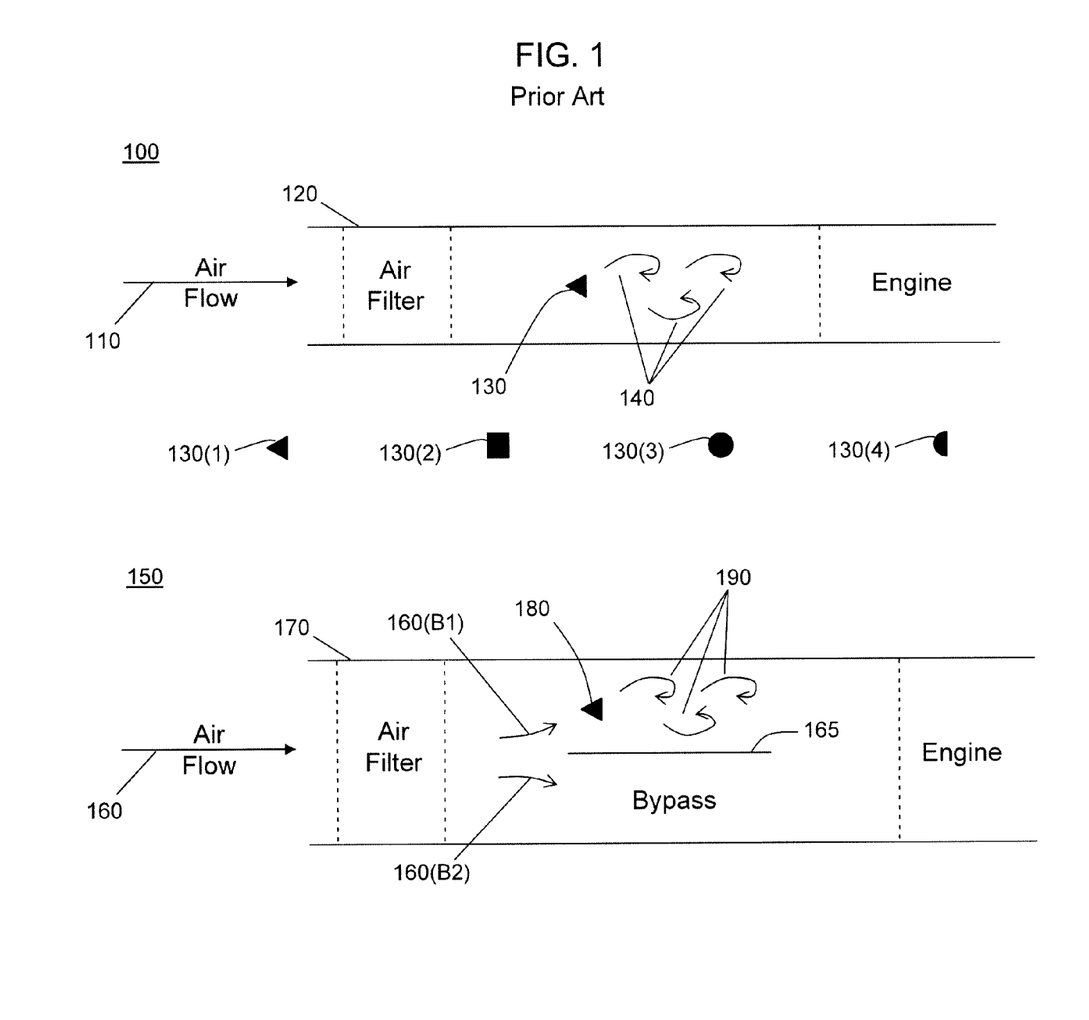
FIG. 1 is a depiction of prior art vortex generators.

Referring first to FIG. 1, prior art vortex generators for combustion engines are shown. Device 100 comprises an air filter, an engine, channel 120, bluff body 130, and an associated airflow 110 and vortex street 140. The channel 120 is a tube, duct, channel, section, etc., of known cross sectional area and is shown only in two-dimensions. For consistency, the term "section" is used when an initial fluid or a portion thereof is provided and the term "channel" is used when a stage or part of the section has a cross-sectional flow area sized to provide the desired range of bluff body Reynolds numbers. Bluff body 130 can be any shape appropriate for design needs. Several shapes such as square triangular or pyramidal 130(1), rectangular prism or cubic 130(2), cylindrical 130(3), and semi-cylindrical 130(4) are shown in FIG. 1. It is to be understood that the bluff bodies are 3-dimensional shapes inserted into the fluid flow and are well-known to those skilled in the art.

Airflow 110 enters section 120 and has a characteristic Reynolds number (Re). In fluid mechanics, the Reynolds number is a dimensionless number that is the ratio of the fluid velocity (inertial forces) divided by fluid viscosity (viscous forces), and multiplied by fluid density and characteristic length. For purposes of the description, fluid density and characteristic length are omitted from the discussion. In these devices, Reynolds numbers can range from zero (no flow) up to one hundred thousand or so. At low Reynolds numbers viscosity characteristics are dominant and the fluid flow tends to remain laminar (i.e., it flows smoothly); while at high Reynolds numbers inertial force effects are dominant and the laminar flow breaks down into turbulent flow. Turbulent flows are chaotic flows to the point that certain flow parameters become stochastic (i.e., non-deterministic), and hence not usable in the present invention.

Many applications that may benefit from embodiments describe herein have maximum response time requirements. As a practical matter, the fastest response time is one period (or half-period, depending on the detection method) of the vortex generation or passing frequency; this period cannot be longer than the maximum response time requirement of the application. Embodiments of the present invention permit easy scaling of the vortex generation or passing frequency to meet response times required by a particular application, and which will be described in greater detail hereinafter.

Section 120 is shown in two dimensions and may be a tube, pipe, cylinder, rectangle, or any functional cross-sectional shape for which the cross-sectional area is known. As the fluid flow 110 passes over bluff body 130, vortex street 140 is generated. Vortex street 140 is a series of eddies that are generated alternately in time, one by one, as they pass bluff body 140 as shown. The eddies are depicted in the figures as swirls that rotate inwards with respect to the bluff body 130. These eddies are similar to eddies that form downstream of a partially submerged pillar or pile in a smoothly flowing river, or the wake of a gently circulated coffee stirrer. The frequency with which the swirls are generated is approximately proportional to the fluid velocity and inversely proportional to the width of the bluff body (e.g., bluff body 130). The fluid velocity multiplied the cross-sectional area yields volumetric fluid flow. The frequency with which vortices are generated at the bluff body, or passed or shed from the bluff body is measured by an associated sensor known to those skilled in the art.

In section 120, the Reynolds number (determined by the local flow velocity 110 and bluff body width 130) must reach a minimum of about 20 to 40 to produce a vortex street. As the flow Reynolds number increases beyond a range of 2,000 to 20,000, the vortex system produced becomes increasingly chaotic; it then becomes difficult to make a frequency measurement of the vortex generation or passing frequency. Therefore, it is a desirable aspect of this invention that it permits easy scaling of the local fluid flow velocity to maintain a Reynolds number within this approximate range.

At 150, a second prior art vortex generation device similar to device 100 is shown in which airflow 160 enters section 170 and is separated into bypass airflows 160(B1) and 160(B2) by plate 165. Airflow 160(B2) is simply bypassed while airflow 160(B1) flows past bluff body 180 which generates vortex street 190.

Figure 2:
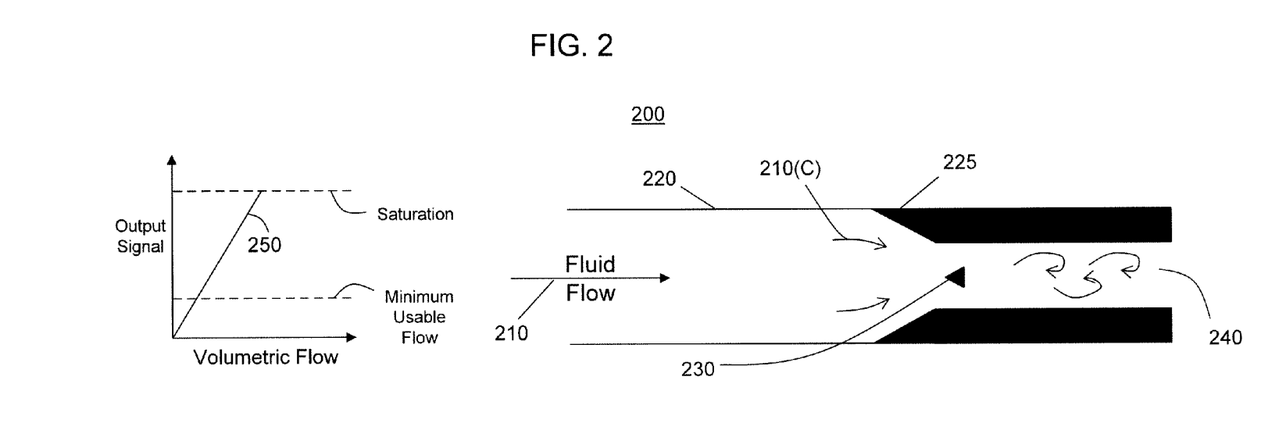
FIGS. 2-7 are example diagrams of vortex generation devices using convergent or divergent sections according to embodiments of the present invention.

Referring to FIG. 2, vortex generating device 200 is shown with a convergent nozzle according to an embodiment of the present invention. Device 200, unlike the devices of FIG. 1, is generalize for all fluid flows and is not depicted as part of a combustion engine. Device 200 comprises section 220, convergent nozzle 225, bluff body 230, and an associated airflow 210 and vortex street 240. In this example, fluid flow 210 is converged into fluid flow 210(C) prior to passing over bluff body 230. Convergent nozzle 225 accelerates fluid flow 210 thereby increasing the Reynolds number at bluff body 230.

Thus, airflows with Reynolds numbers too low to be detected by devices 100 or 150 can be detected by device 200, thereby lowering the lower bound of the range of flow velocities that can be measured or detected for fluid flow 210. A response curve 250 for an associated sensor device shows the relationship between volumetric flow and an output signal. The volumetric flow, i.e., Reynolds number, of fluid flow 210 has a minimum usable flow and a saturation point, i.e., the flow becomes turbulent as described above. The minimum usable flow may be determined based on a required response time. For example, if an engine needs to regulate fuel flow at 30 Hertz, then the frequency of the vortices must be high enough such that a measured change in vortex shedding frequency is meaningful. The output signal may be proportional to the frequency of vortices generated by bluff body 230 and may be represented as a clock frequency, voltage, or other designed output known to those skilled in the art. As the volumetric flow increases, so does the output signal, until maximum usable flow is detected, e.g., the fluid flow has saturated. The response curves shown in the various figures are idealized or conceptual, and are not to scale and are depicted simplistically, i.e., real world non-linearities are not shown.

Figure 6:
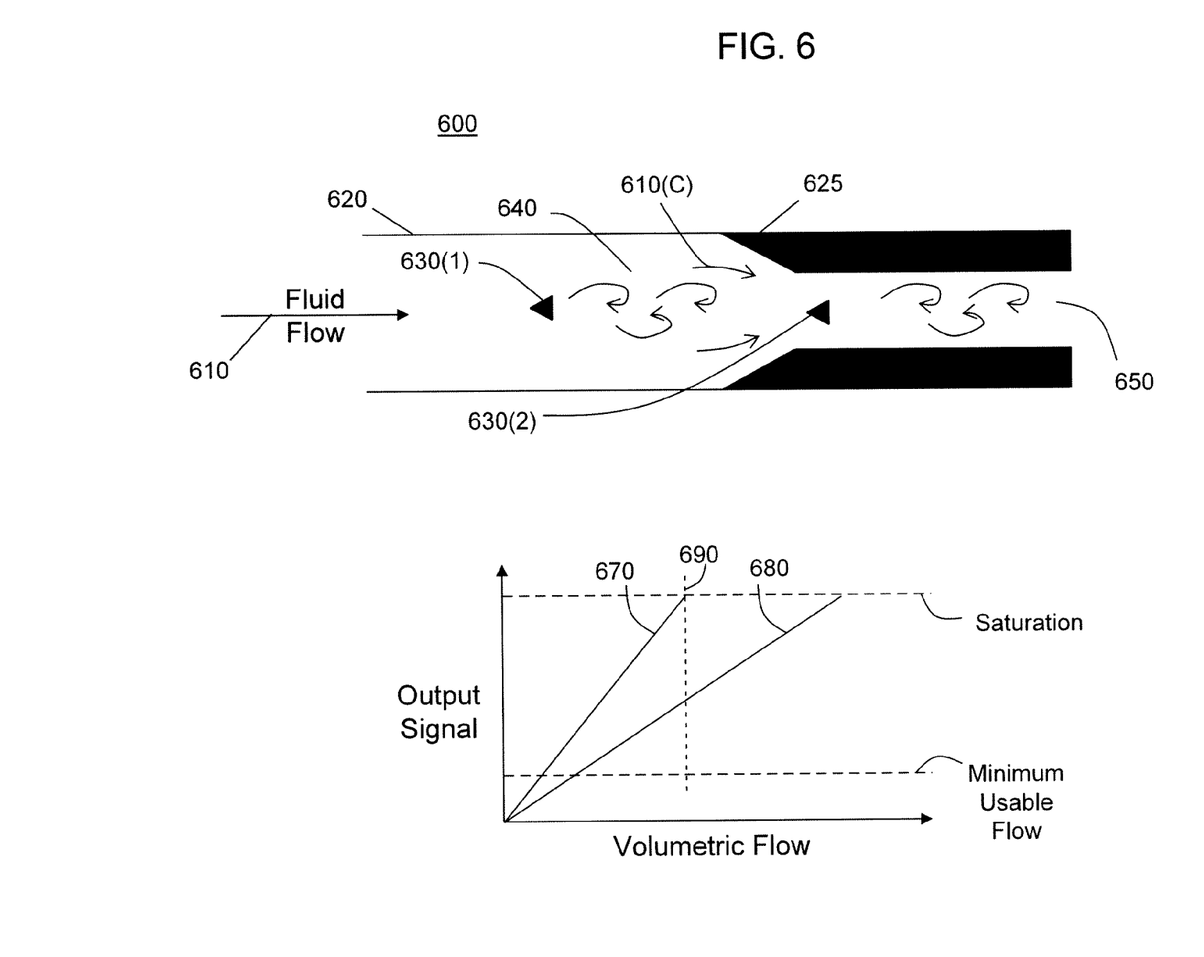

By virtue of converging fluid flow 210 into fluid flow 210(C), however, the upper bound of the range of velocities for detecting the velocity of fluid flow 210 is also lowered. The original upper range of detectable fluid flow velocities can be restored by inserting a second vortex generator into the original unconverged fluid flow 210 as shown in FIG. 6, described hereinafter.

Figure 3:
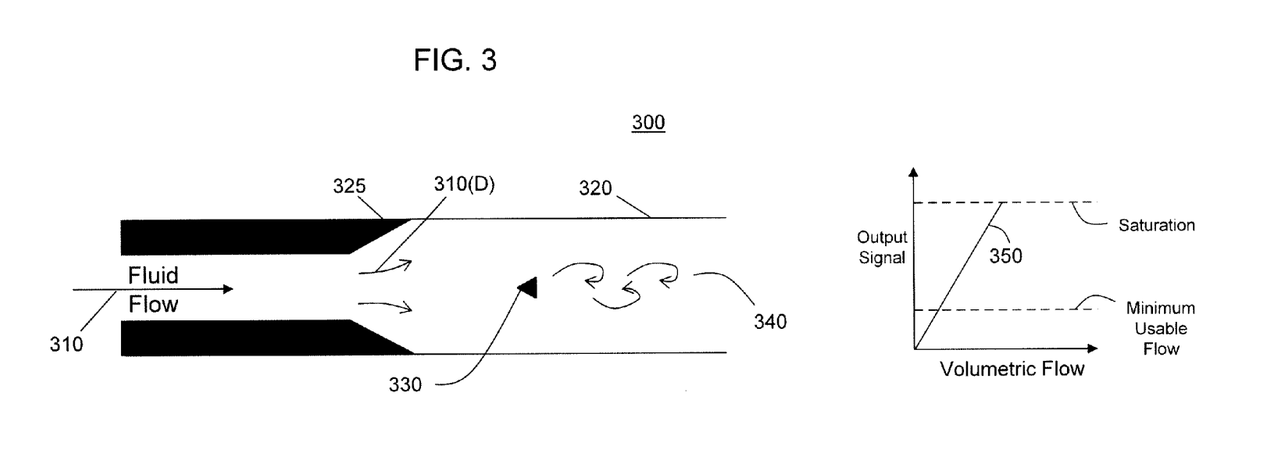

Turning to FIG. 3, vortex generating device 300 is shown with a divergent nozzle according to an embodiment of the present invention. Device 300 comprises section 320, divergent nozzle 325, bluff body 330, and an associated airflow 310 and vortex street 340. In this example, fluid flow 310 is diverged into fluid flow 310(D) prior to passing over bluff body 330. Divergent nozzle 325 decelerates fluid flow 310 thereby reducing the Reynolds number at bluff body 330.

Figure 11:
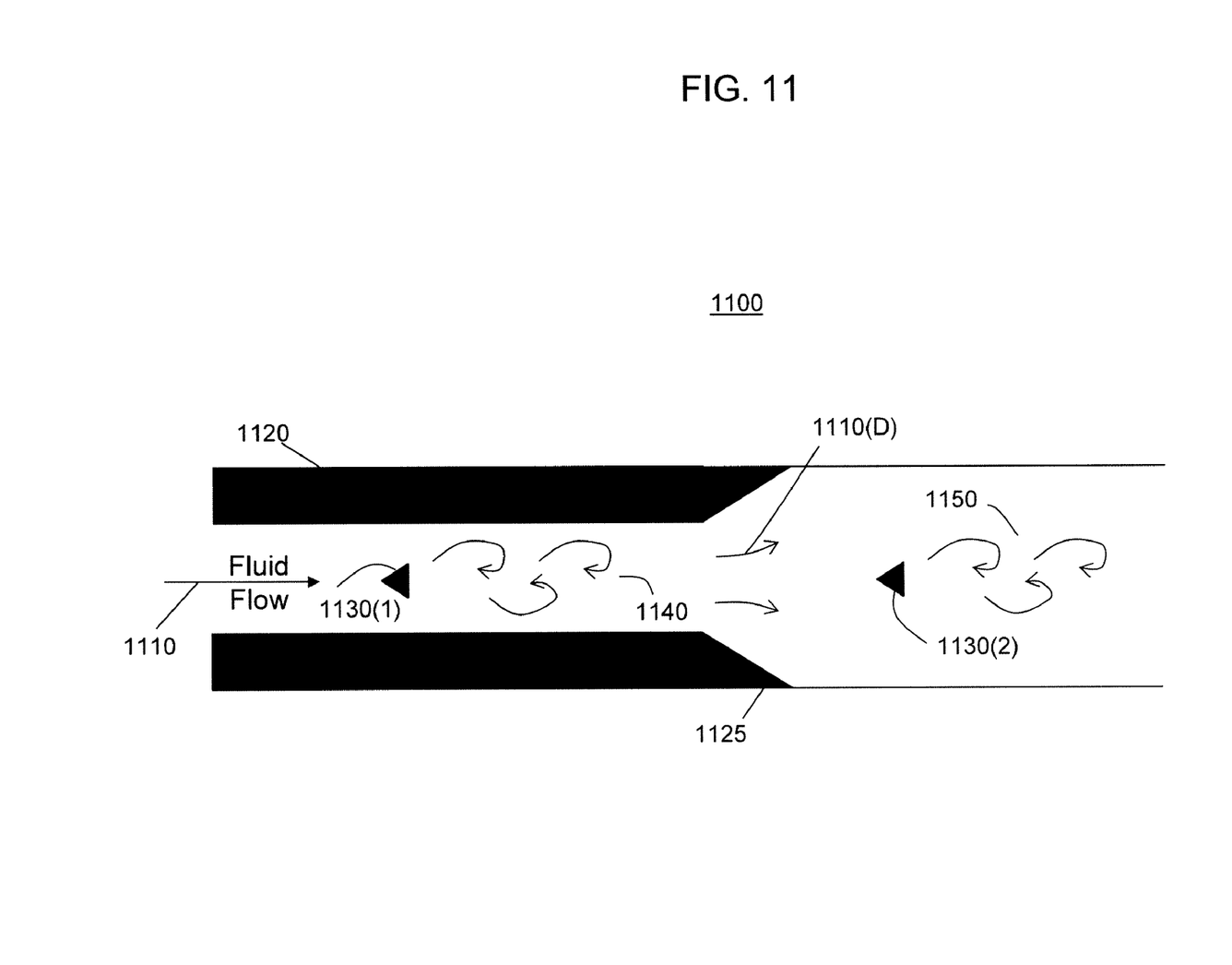
FIG. 11 is an example diagram of a vortex generation device using a divergent section according to an embodiment of the present invention.

Thus, airflows with Reynolds numbers too high to be detected within the undiverged fluid flow 310 can be detected by device 300, thereby raising the upper bound of the range of flow velocities that can be measured or detected for fluid flow 310. A response curve for the associated device is shown at 350. Again, by virtue of diverging fluid flow 310 into fluid flow 310(D) the lower bound of the range of velocities for detecting the velocity of fluid flow 310 is also raised. The original lower range of detectable fluid flow velocities can be restored by inserting a second vortex generator into the original undiverged fluid flow 310 as shown in FIG. 11, described hereinafter.

Figure 4:
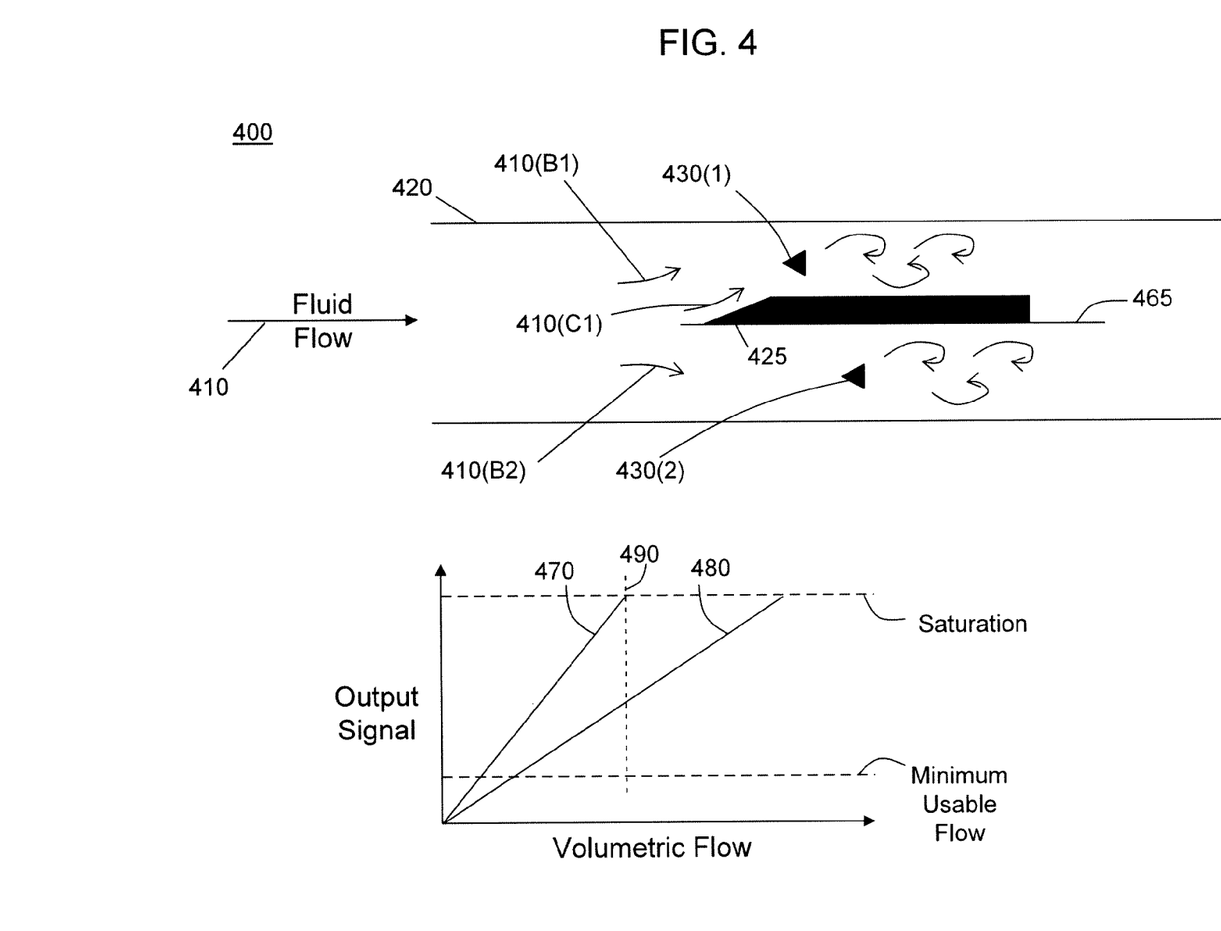

Referring now to FIG. 4, a device 400 comprising a section with two parallel channels is depicted. Device 400 comprises section 420, convergent nozzle 425, bluff bodies 430(1) and 430(2), and an associated fluid flow 410. Fluid flow 410 separated into fluid flows 410(B1) and 410(B2) by bypass plate 465. Fluid flow 410(B1) is converged into fluid flow 410(C) by convergent nozzle 425 and fluid flow 410(B2)

remains unconverged. Response curves for the channels of the associated device are shown at 470 and 480.

Response curve 470 is associated with vortex shedding frequencies for vortices generated by bluff body 430(1) and response curve 480 is associated with vortex shedding frequencies for vortices generated by bluff body 430(2). At 490, the vertical dashed line indicates that fluid flow 410(C) has become saturated and is no longer measurable. As can be seen from the curves, when fluid flow 410(C) reaches the saturation point at 490 then measurement may be shifted to fluid flow 410(B2) from which reliable measurements may still be obtained. Typically the sensor (not shown) with highest usable output is taken to be the output of the entire assembly of sections/channels and velocity sensors, thereby providing a greater range of measurement and greater frequency response than the prior art systems shown in FIG. 1. These velocity sensors are tolerant of flow velocities far beyond what they will accurately register or measure, so no damage is done by operating them in converged fluid flows. The channels depicted in device 400 are not necessarily to scale and any suitable cross-sectional area for channels associated with fluid flows 410(B1), 410(C), and 410(B2) may be chosen.

Figure 5:
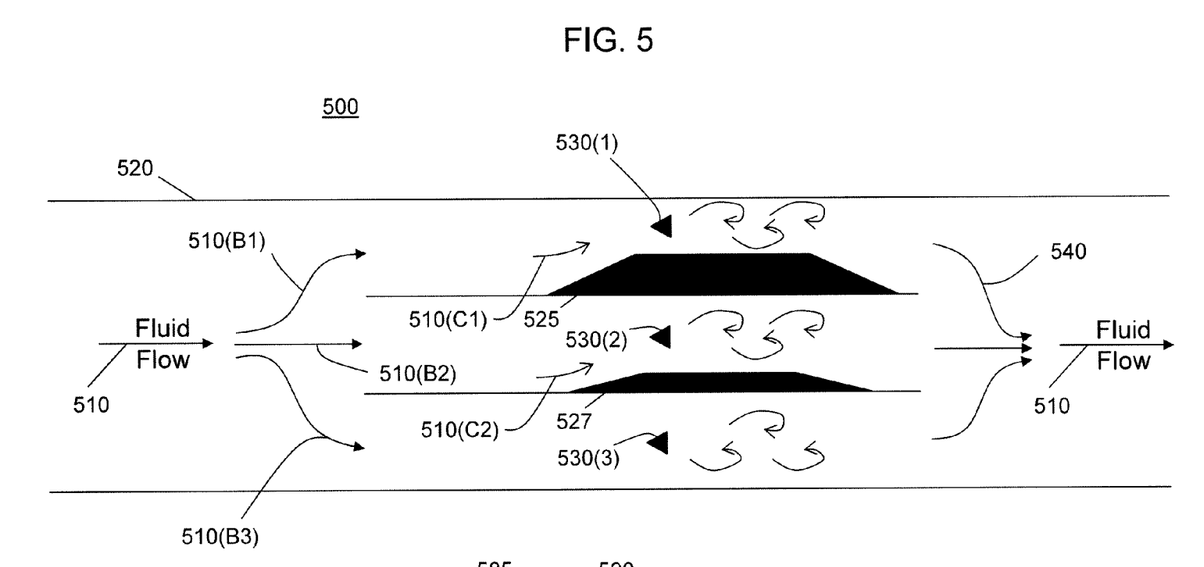

FIG. 5 depicts three parallel section vortex generators in device 500 according to an embodiment of the present invention. Device 500 comprises section 520, convergent nozzles 525 and 527, bluff bodies 530(1)-530(3), and an associated fluid flow 510. Fluid flow 510 separated/bypassed into fluid flows 510(B1), 510(B2), and 510(B3). Fluid flow 510(B1) is converged into fluid flow 510(C1) by convergent nozzle 525, fluid flow 510(B2) is converged into fluid flow 510(C2) by convergent nozzle 527, and fluid flow 510(B3) remains unconverged. As can be seen from the drawing, convergent nozzle 525 has a higher convergence ratio than convergent nozzle 527. At 540, fluid flows 510(B1), 510(B2), and 510(B3) are rejoined to form original fluid flow 510 as shown. Response curves for the channels of the associated device are shown at 570, 575, and 580. As in FIG. 4, saturation points 585 and 590 may be used to transition frequency measurements between channels. The sections depicted in device 500 are not necessarily to scale and any cross-sectional area may be chosen for fluid flows 510(B1)/(C1), 510(B2)/(C2), and 510(B3) prior to and after convergence.

Turning now to FIG. 6, a device 600 is similar to device 200, but incorporates a second bluff body in series with the bluff body. Device 600 comprises section 620, convergent nozzle 625, bluff bodies 630(1) and 630(2), and an associated fluid flow 610. Kármán vortex streets 640 and 650 are generated in series with each other by bluff bodies 630(1) and 630(2), respectively. Response curves for the channels of the associated device are shown at 670 and 680. As shown in the previous figures, saturation point 690 may be used to transition frequency measurements between channels.

Figure 7:
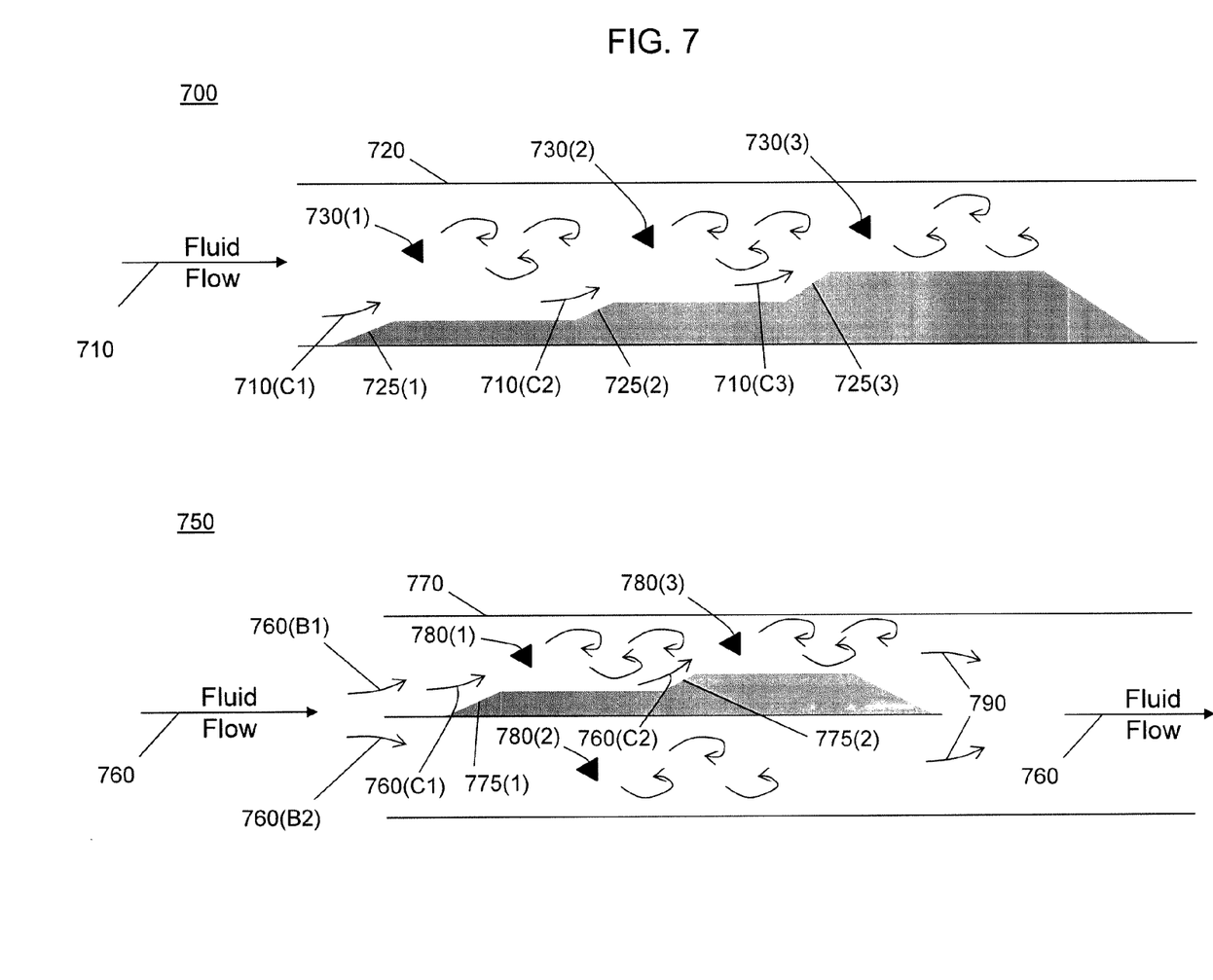

Referring to FIG. 7, vortex generating devices 700 and 750 are shown according to embodiments of the present invention. Device 700 comprises section 720, convergent nozzle 725, bluff bodies 730(1)-730(3), and an associated fluid flow 710. In this example, fluid flow 710 is converged in a series of three stages into fluid flows 710(C1)-710(C3) prior to passing over bluff bodies 730(1)-730(3) respectively. At each stage the cross-sectional area of the channels in section 720 is reduced by convergent nozzle 725 (i.e., the convergence ratio is increased at each stage).

Device 750 depicts series and parallel channel vortex generators and comprises section 770, convergent nozzle 775, bluff bodies 780(1)-780(3), and an associated fluid flow 760. In this example, fluid flow 760 is bypassed or separated into fluid flows 760(B1) and 760(B2). Fluid flow 760(B1) is converged in series two times into fluid flows 760(C1) and 760(C2) prior to passing over bluff bodies 780(1) and 780(2) respectively, while fluid flow 760(B2) is unconverged and passes over bluff body 780(3). At 790, fluid flows 760(B1) and 760(B2) are rejoined to form original fluid flow 760 as shown. Although not depicted, it will be appreciated by those skilled in the art that an addition bluff body may be placed in fluid flow 760 before or after bluff bodies 780(1)-780(3).

Figure 8:
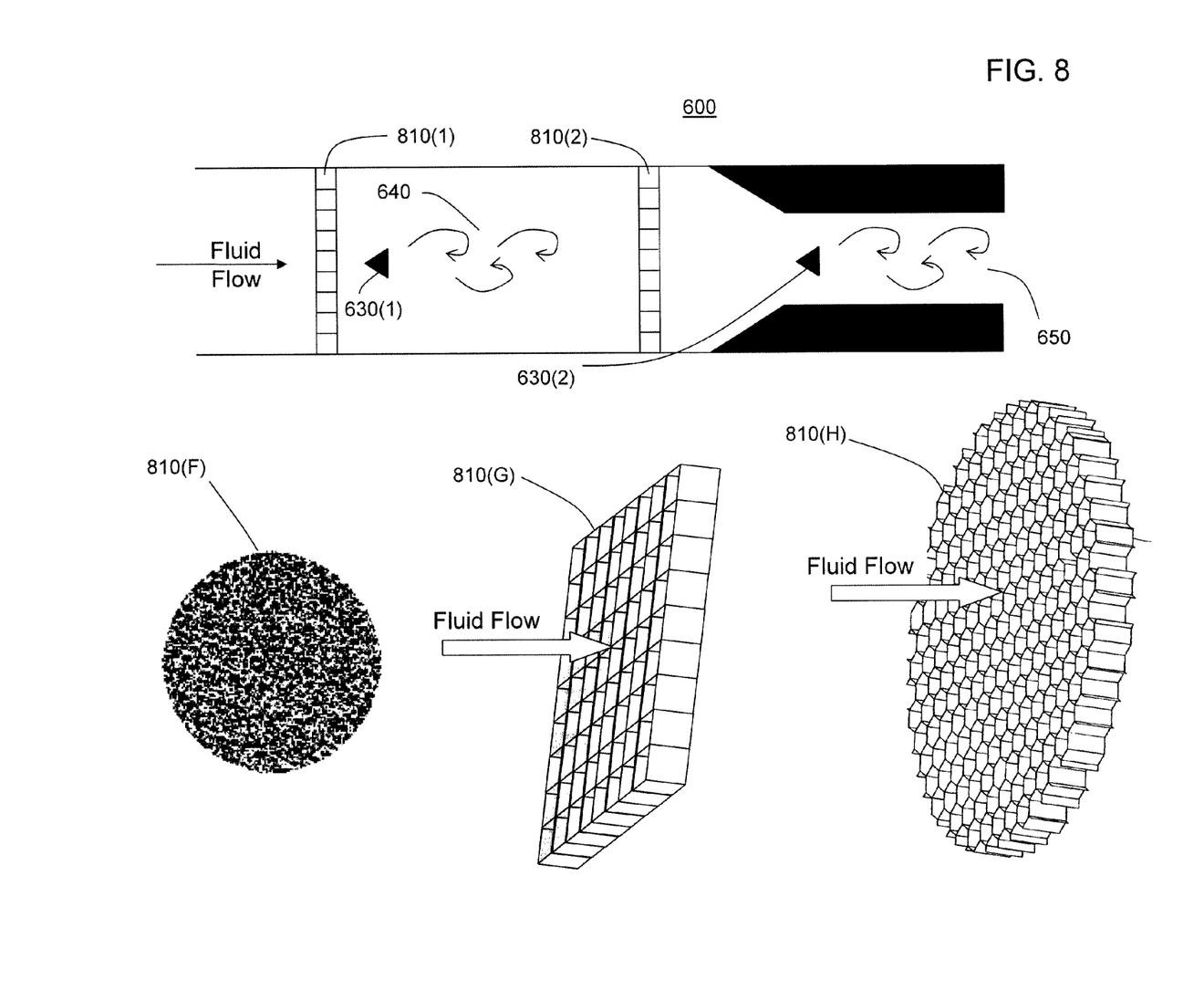
FIGS. 8 and 9 are example diagrams of a vortex generation devices employing fluid flow laminarizers according to an embodiment of the present invention.

Referring to FIG. 8, device 600 from FIG. 6 is depicted with the addition of two fluid flow laminarizers 810(1) and 810(2). Laminarizers 810(1) and 810(2) smooth the airflow by removing turbulence or other unwanted effects. For example, the vortices generated by bluff body 630(1) could influence the vortices generated by bluff body 630(2) (e.g., unwanted coupling between vortex streets 640 and 650 could influence vortex frequency detection in vortex street 650). To remove these unwanted influences laminarizer 810(2) is placed between bluff body 630(1) and bluff body 630(2).

Figure 9:
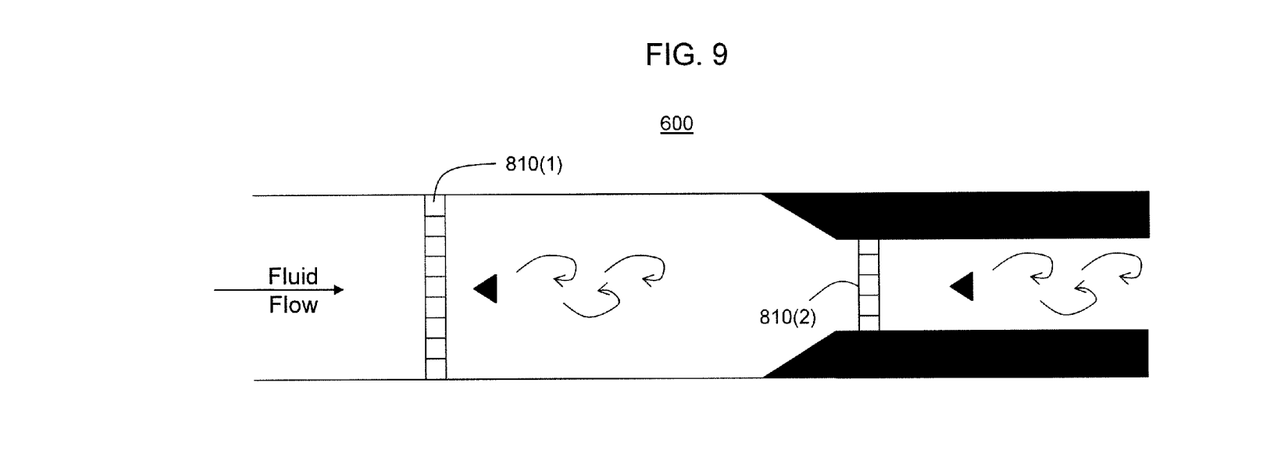

Several techniques known in the art for laminarizing fluid flow 210 include adding a porous material, such as open cell foam 810(F) or frit plates (not shown), screen materials or grids 810(G), or honeycombs 810(H) in the flow stream. The techniques used to laminarize fluid flow 810 should take into account the scaling effects of vortex street 640. For example, if honeycomb 510(H) is used then the size of each hexagon should be smaller than an individual vortex in vortex street 640. FIG. 9 depicts a laminarizer 810(2) from FIG. 8 within the converged channel of device 600.

Figure 10:
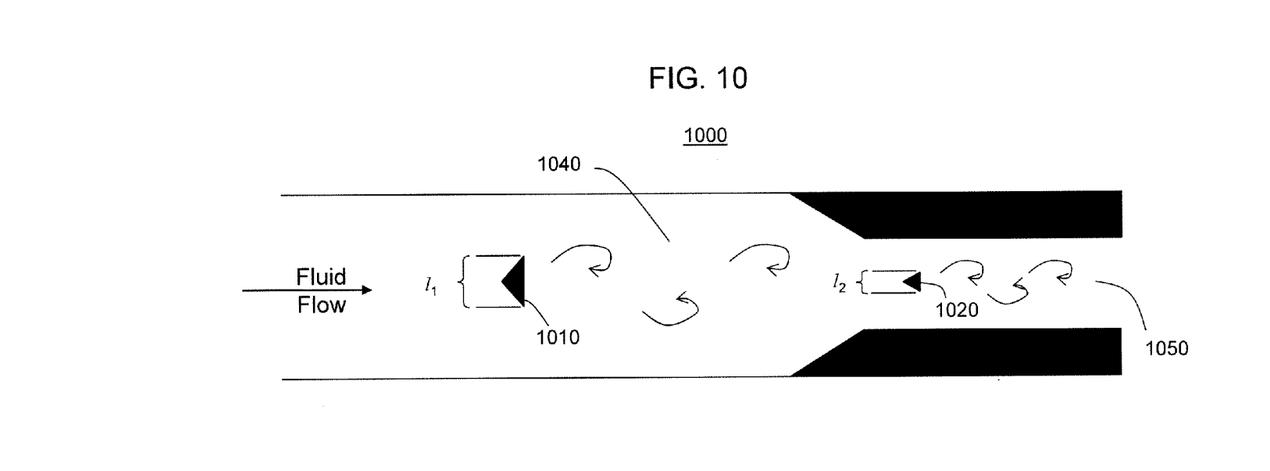
FIG. 10 is an example diagram of a vortex generation device employing scaled bluff bodies according to an embodiment of the present invention.

Turning now to FIG. 10, an example diagram of a vortex generation device 1000 employing scaled bluff bodies is shown. Bluff body 1010 is scaled to a characteristic length $l_1$ and bluff body 1020 is scaled to a characteristic length $l_2$. The scaling of bluff body 1010 generates a vortex street 1040 with both larger and more spaced apart vortices than vortex street 1050 generated by bluff body 1020. Such scaling effects can modify both the vortex shedding frequency and range of the device 1000. As will be appreciated by those skilled in the art, the techniques describe herein permit easy scaling of the vortex generation or passing frequency to meet response times required by a particular application by scaling the bluff bodies and/or the convergent/divergent ratios of the various sections.

Referring to FIG. 11, a vortex generation device 1100 with a divergent nozzle is shown. Device 1100 comprises section 1120, divergent nozzle 1125, bluff bodies 1130(1) and 1130(2), an associated airflow 1110, and vortex streets 1140 and 1150. In this example, fluid flow 1110 is diverged into fluid flow 1110(D) prior to passing over bluff body 1130(2). Divergent nozzle 1125 decelerates fluid flow 1110 as it is "expanded" into fluid flow 1110(D).

Figure 12:
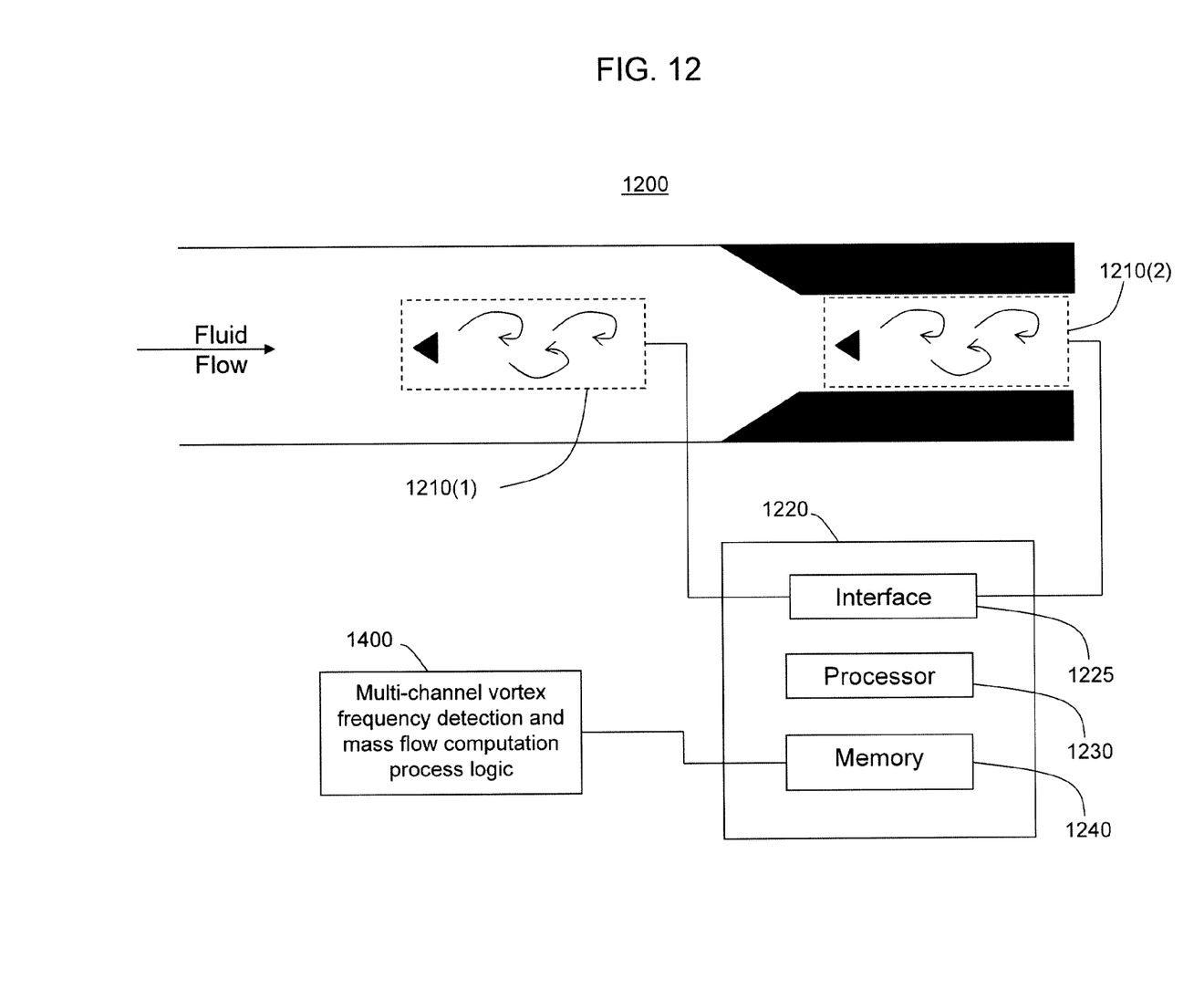
FIG. 12 is an example diagram of a vortex generation device employing a vortex velocity sensor package according to an embodiment of the present invention.
Figure 14:
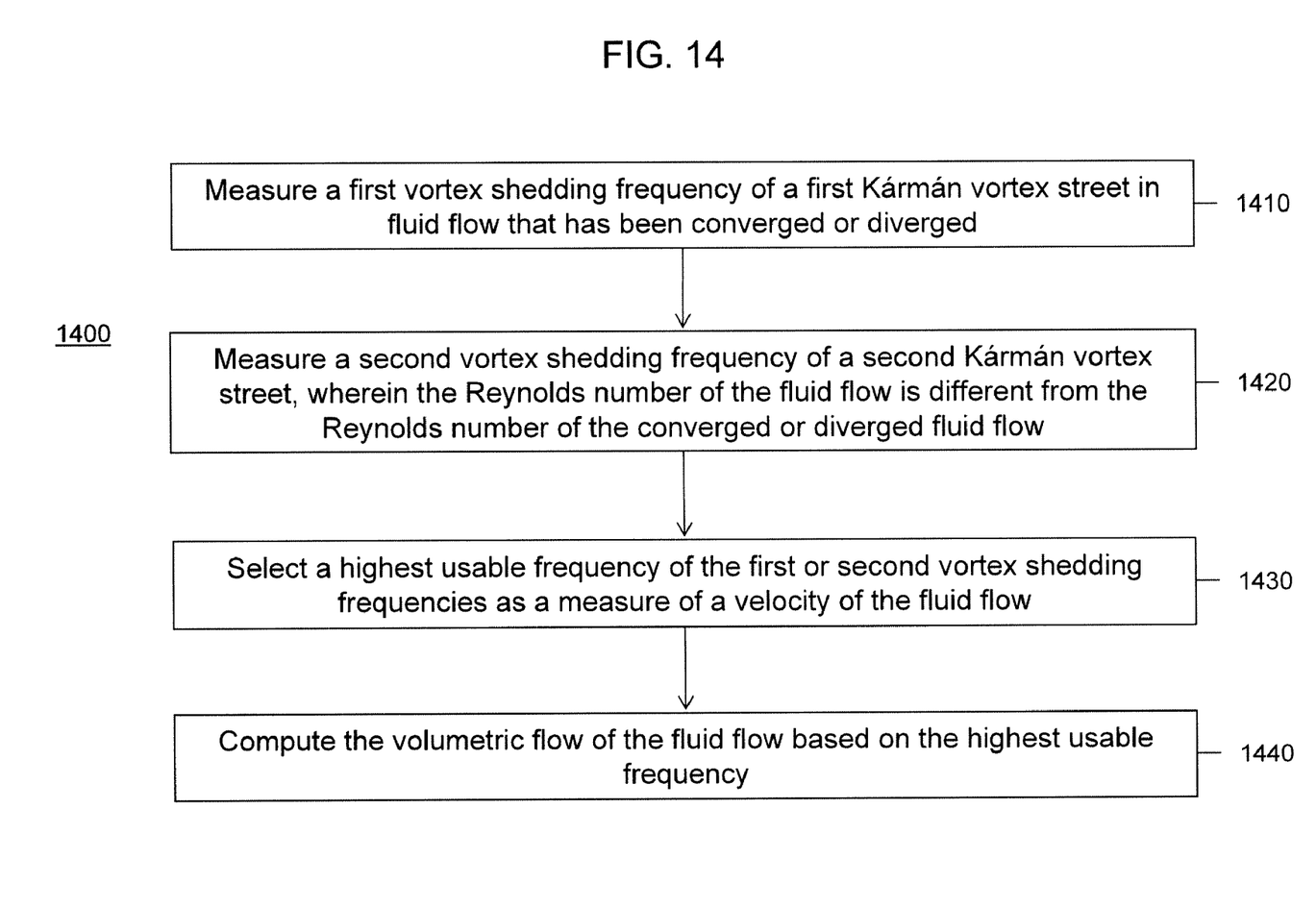
FIG. 14 is a flow chart generally depicting process logic for measuring volumetric flow in a device with two channels and two von Kármán vortex streets in converged or diverged fluid flows.

Referring to FIG. 12, an example of a block diagram of a vortex generation device 1200 with a sensor package that is configured to implement multi-channel vortex frequency detection and mass flow computation process logic 1400 is shown. The device 1200 comprises, sensors 1210(1) and 1210(2) and a processing unit or module 1220 with an interface unit 1225, a data processing device 1230, e.g., a microprocessor, microcontroller, etc., and a memory 1240 or other data storage block that stores data and/or instructions used for the techniques described herein. The interface unit exchanges signals and/or provides power to the sensors 1210(1) and 1210(2). The memory 1240 may be separate or part of the processor 1230. Instructions for performing the multi-channel vortex frequency detection and mass flow computation process logic 1400 may be stored in the memory 1240 for execution by the processor 1230. The process logic 1400 allows the device 1200 to measure the flow velocity or mass flow of a fluid flowing or passing through the device 1200.

The process logic 1400 is described in conjunction with FIG. 14.

The functions of the processor 1230 may be implemented by a processor readable tangible medium encoded with instructions or by logic encoded in one or more tangible media (e.g., embedded logic such as an application specific integrated circuit (ASIC), digital signal processor (DSP) instructions, software that is executed by a processor, etc.), wherein the memory 1240 stores data used for the computations or functions described herein (and/or to store software or processor instructions that are executed to carry out the computations or functions described herein). Thus, the process logic 1400 may be implemented with fixed logic or programmable logic (e.g., software/computer instructions executed by a processor or field programmable gate array (FPGA) or s system on a chip (SOC).

The sensors 1210(1) and 1210(2) are configured to detect, sense, or otherwise measure the vortex shedding frequency of the respective vortex streets. The sensors 1210(1) and 1210(2) may also be configured to measure environmental variables, such as, temperature, pressure, and the like. Using data from the sensors 1210(1) and 1210(2) the process logic 1400 measures the velocity or mass flow of a fluid flowing or passing through the device 1200. Having measured the velocity or mass flow of a fluid flowing or passing through the device 1200, the module 1220 may relay or transmit the information to, e.g., a fuel control unit or HVAC airflow status indicator.

Figure 13A:
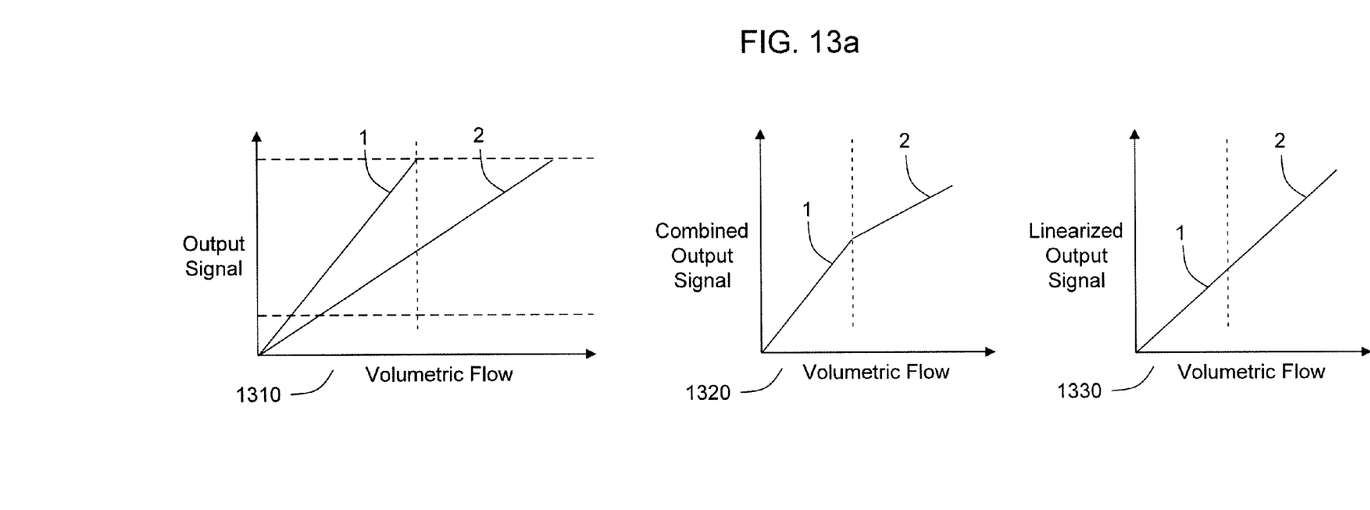
FIGS. 13*a* and 13*b* depict example response curves for volumetric flow measurement in devices with two and three sensors, respectively.

Referring to FIG. 13*a* with continued reference to FIG. 12, example response curves are depicted for a vortex generator with two sensors. At 1310, response curves 1 and 2 are shown for a device with two sensors, in series or in parallel. The response curves are similar to the ones depicted in FIGS. 4 and 6. By way of example, response curve 1 may correspond to an output associated with sensor 1210(2) and response curve 2 may correspond to an output associated with sensor 1210(1). Note that as volumetric flow increases sensor 1210(2) will saturate first as indicated by the vertical dashed lines in FIG. 13*a*. At 1320, a combined response curve is depicted for the entire device, e.g., device 1200. At 1330, the combined response curve is electronically or computationally linearized by, e.g., processor 1230 or other circuitry (not shown) in module 1220.

Figure 13B:
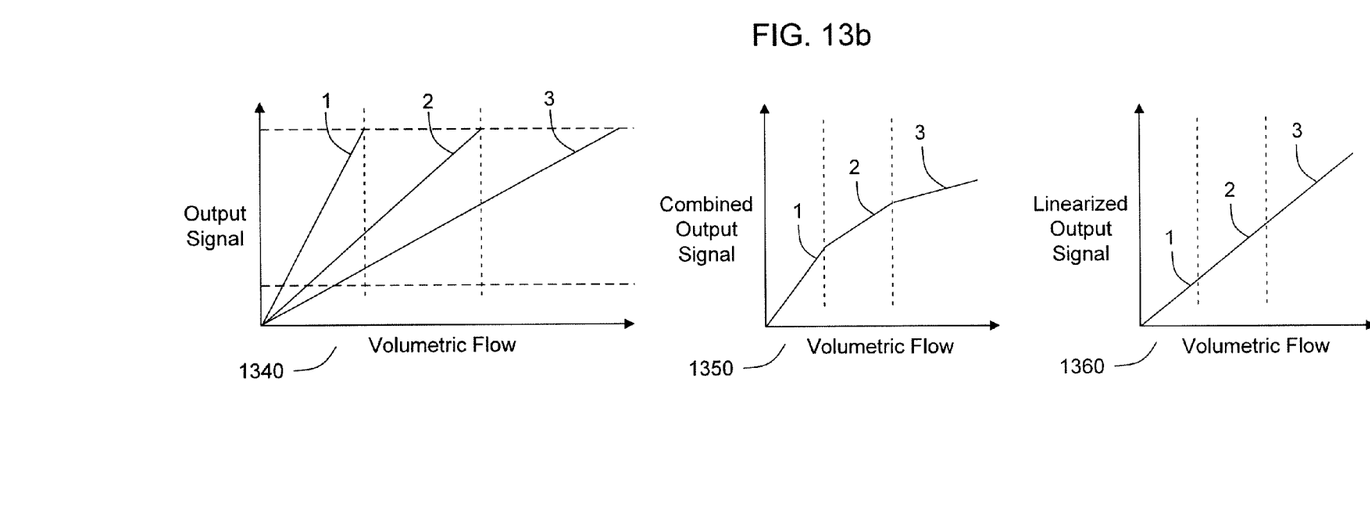

Referring to FIG. 13*b*, example response curves are depicted for a vortex generator with three sensors. At 1340, response curves 1, 2, and 3 are shown for a device with three sensors, in series and/or in parallel. The response curves are similar to the ones depicted in FIG. 5 or that may be associated with the devices depicted in FIG. 7. As volumetric flow increases a sensor associated with response curve 1 will saturate first, followed by saturation of a sensor associated with response curve 2, as indicated by the vertical dashed lines in FIG. 13*b*. At 1350, a combined response curve is depicted for the entire device. At 1360, the combined response curve is linearized as described above. Although examples have been given in FIGS. 13*a* and 13*b* for two and three sensor devices, respectively, the techniques described herein are extensible to any number of sensors. And as can be seen from these response curves the frequency response of an associated device can be easily adjusted to meet design criteria or constraints. FIGS. 13*a* and 13*b* are example response curves and are not necessarily to scale and are not necessarily linear.

Turning now to FIG. 14, multi-channel vortex frequency detection and mass flow computation process logic 1400 is described. The logic encoded in one or more tangible media for execution and when executed operable to, at 1410, measure a first vortex shedding frequency of a first Kármán vortex street in fluid flow that has been converged or diverged, and at 1420, measure a second vortex shedding frequency of a second Kármán vortex street, wherein the Reynolds number of the fluid flow is different from the Reynolds number of the converged or diverged fluid flow. At 1430, a highest usable frequency of the first or second vortex shedding frequencies is selected as a measure of a velocity of the fluid flow. And at 1440, the volumetric flow of the fluid flow is computed based on the highest usable frequency. Additional logic may be incorporated in order to measure one or more environmental variables and compute the mass flow of the fluid flow based on the highest usable frequency and the one or more of environmental variables.

Logic is further provided where detecting a first vortex shedding frequency comprises detecting the first vortex shedding frequency in a first channel of known cross-sectional area and detecting a second vortex shedding frequency comprises detecting the second vortex shedding frequency in a second channel of unknown cross-sectional area, and computing the cross-sectional area of the second channel based on the first and second vortex shedding frequencies.

The logic further comprises logic configured to cross-check the first vortex shedding frequency with the second vortex shedding frequency and determine if a failure is present in a device based on the cross-check of the first and second vortex shedding frequencies.

Figure 15:
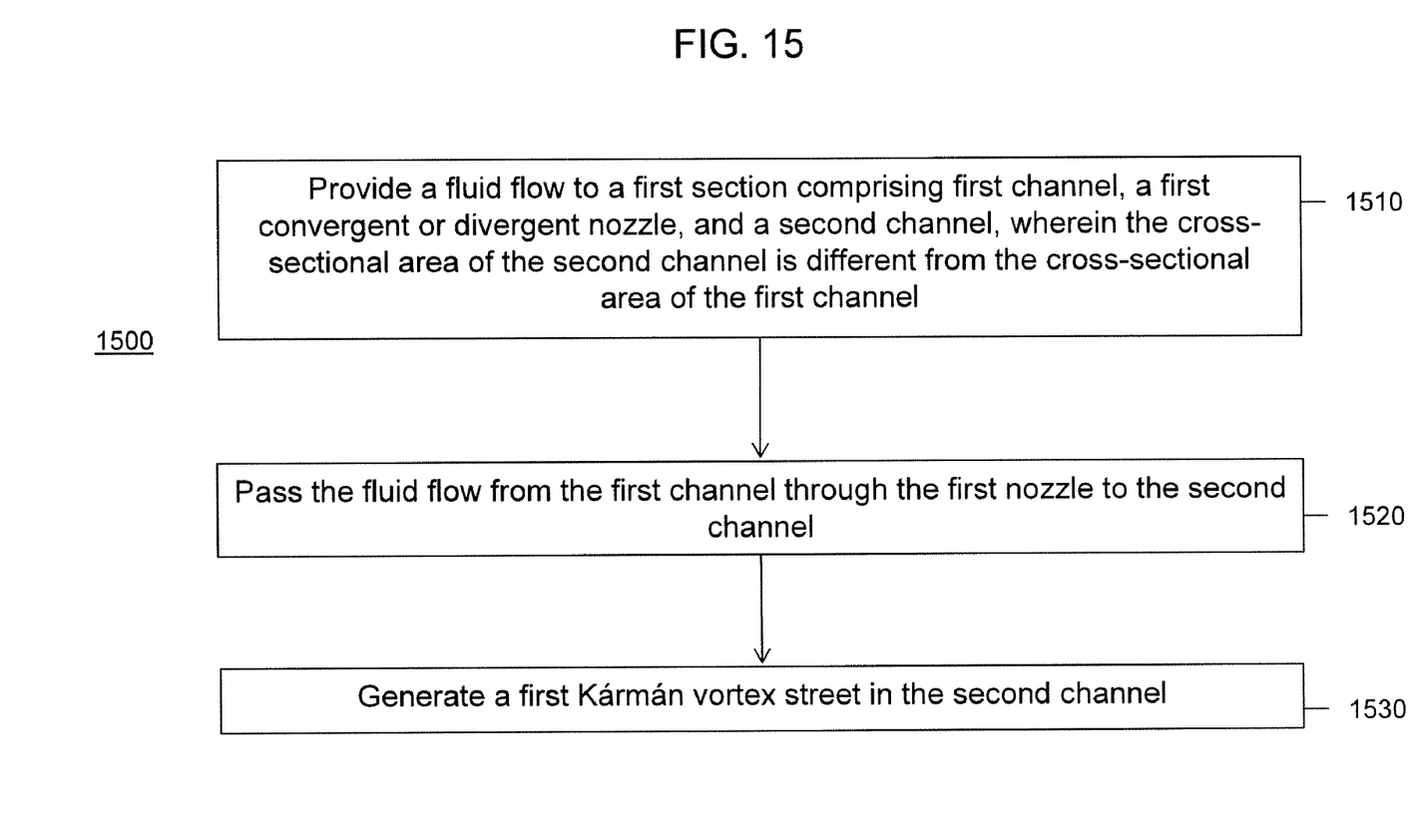
FIG. 15 is a flow chart generally depicting a method for generating a von Karman vortex street in a converged or diverged fluid flow with multiple channels.

Referring now to FIG. 15, a flow chart generally depicting a method for generating a von Kármán vortex street in a converged or diverged fluid flow with multiple channels is described. At 1510, a fluid flow is provided to a first section comprising first channel, a first convergent or divergent nozzle, and a second channel, wherein the cross-sectional area of the second channel is different from the cross-sectional area of the first channel. At 1520, the fluid flow is passed from the first channel through the first nozzle to the second channel. And at 1530, a first Kármán vortex street is generated in the second channel.

It will be appreciated that the embodiments described above and illustrated in the drawings represent only a few of the many ways of implementing a vortex generator for extended flow ranges and a faster response.

The several examples of a single channel vortex generator, serial channel vortex generators, and parallel channel vortex generators using converged fluid flows are not meant to be limiting. It is clear from the examples that any number of vortex generators may be implemented. The vortex generators may be arranged in any fashion of serial or parallel combinations. The vortex generators may be spaced apart from one another. Any combination of channel cross-sectional areas may be implemented for separated fluid flows. Nozzles may have any convergence ratio. Thus, any combination of vortex generated may be implemented without diverging from the concept of generating a von Kármán vortex street in a converged fluid flow.

Examples have been given for vortex generators used to measure airflow velocity in combustion engines. These examples are not meant to be limiting. Fluid flow measurement is important in many applications and in many fields of endeavor. For example, the techniques described herein may be used to generate vortex streets in:

jet fuel and used to measure fluid flow into a jet engine, measure fuel flow between fuel tanks, or compare fuel flows into and out of a fuel line for leak detection;

hydrogen, oxygen, hydrazine, kerosene, etc., and used to measure flow into a combustion chamber;

air and used to measure airflow in heating, ventilation, and air conditioning (HVAC) systems using forced airflow; or hydraulic fluid and used to detect leaks.

Although the apparatus, logic, and method are illustrated and described herein as embodied in one or more specific examples, it is nevertheless not intended to be limited to the details shown, since various modifications and structural changes may be made therein without departing from the scope of the apparatus, logic, and method and within the scope and range of equivalents of the claims. Accordingly, it is appropriate that the appended claims be construed broadly and in a manner consistent with the scope of the apparatus, logic, and method, as set forth in the following claims.

What is claimed is:

1. A method comprising:
providing a fluid flow to one or more channels;
generating a plurality of Kármán vortex streets in one or more of the channels; and
measuring a vortex shedding frequency and/or a vortex passing frequency of two or more of the plurality of Kármán vortex streets.

2. The method of claim 1, wherein a cross-sectional area of a first channel is scaled relative to a cross-sectional area of of a second channel by way of a divergent or convergent nozzle and a Reynolds number of the fluid flow in the second channel is decreased or increased to a desired value, and wherein generating comprises generating a first Kármán vortex street in the first channel and a second Kármán vortex street in the second channel.

3. The method of claim 1, wherein generating comprises generating a first Kármán vortex street in series with a second Kármán vortex street in the second channel.

4. The method of claim 1, further comprising dividing the fluid flow between first and second sections within a channel; and
wherein generating comprises generating a first Kármán vortex street in the first section and the second Kármán vortex street in the second section such that the first and second Kármán vortex streets are generated in parallel.

5. The method of claim 1,
wherein generating comprises generating the plurality of Kármán vortex streets using bluff bodies of differing widths.

6. The method of claim 1, further comprising:
scaling a cross-sectional area of a first and/or a second channel such that the scaling of the cross-sectional areas of the channels optimizes a vortex shedding and/or passing frequency for a first and/or a second Kármán vortex street generated within the first and/or second channels, respectively.

7. The method of claim 1, further comprising:
cross-checking a first vortex shedding and/or passing frequency with a second vortex shedding and/or passing frequency; and
determining if a failure is present based on the cross-check of the first and second vortex shedding and/or passing frequencies.

8. The method of claim 1, further comprising:
selecting one or more of a highest usable vortex shedding frequency, vortex passing frequency, and a best response time of a first or a second Kármán vortex street; and
computing the volumetric flow of the fluid flow based on the highest usable vortex shedding frequency, vortex passing frequency and/or the best response time.

9. The method of claim 8, further comprising:
measuring one or more environmental variables such as temperature, pressure, and fluid composition; and
computing the mass flow of the fluid flow based on the highest usable frequency and the one or more environmental variables.

10. The method of claim 1, further comprising:
bypassing portions of the fluid flow into a plurality of channels of various or identical cross-sectional areas, wherein the channels are arranged in series and/or in parallel or combinations thereof;
arranging a plurality of nozzles within the plurality of channels such that portions of the bypassed fluid flow may be converged or diverged a plurality of times in order to generate a plurality of Kármán vortex streets;
arranging a plurality of bluff bodies within the converged or diverged portions of the fluid flow configured to generate Kármán vortex streets; and
generating a plurality of more Kármán vortex streets using the plurality of bluff bodies.

11. The method of claim 1, further comprising laminarizing the fluid flow in one or more of the channels.

12. An apparatus comprising:
a plurality of channels;
a plurality of bluff bodies configured to generating at least first and second Kármán vortex streets:
a first sensor configured to measure a vortex shedding frequency and/or a vortex passing frequency of the first Kármán vortex street; and
a second sensor configured to measure a vortex shedding frequency and/or a vortex passing frequency of the second Kármán vortex street.

13. The apparatus of claim 12, wherein a cross-sectional area of a first channel is scaled relative to a cross-sectional area of of a second channel by way of a divergent or convergent nozzle and a Reynolds number of a fluid flow in the second channel decreased or increased to a desired value.

14. The apparatus of claim 12, wherein at least two bluff bodies are in series with each other within one or more channels.

15. The apparatus of claim 12, wherein a first channel comprising a bluff body and a second channel comprising a bluff body are in parallel.

16. The apparatus of claim 12, wherein a width of a first bluff body is scaled to a different width than a second bluff body.

17. The apparatus of claim 16, wherein the width of the first and second bluff bodies are scaled to a characteristic length that optimizes a vortex shedding and/or passing frequency response for the first and second Kármán vortex streets.

18. The apparatus of claim 12, further comprising a processor configured to:
cross-check the first vortex shedding and/or passing frequency with the second vortex shedding frequency; and
determine if a failure is present in the apparatus based on the cross-check of the first and second vortex shedding and/or passing frequencies.

19. The apparatus of claim 12, further comprising a processor configured to:
select one or more of a highest usable frequency and a best response time between the first or second vortex shedding and/or passing frequencies; and
compute the volumetric flow of the fluid flow based on the highest usable frequency and/or the best response time.

20. The apparatus of claim 19, further comprising a processor configured to:
  measure one or more environmental variables; and
  compute the mass flow of the fluid flow based on the highest usable frequency and/or the best response time, and the one or more environmental variables.

21. The apparatus of claim 12, further comprising:
  one or more bypasses configured to bypass portions of the fluid flow into a plurality of channels of various or identical cross-sectional areas, wherein the channels are arranged in series and/or in parallel or combinations thereof;
  a plurality of nozzles within the plurality of sections configured to converge or diverge portions of the fluid flow in order to generate a plurality of Kármán vortex streets;
  three or more bluff bodies within the plurality of sections configured to generate Kármán vortex streets.

22. The apparatus of claim 12, further comprising a sensor package configured to measure the vortex shedding and/or passing frequency of a plurality of Kármán vortex streets.

23. The apparatus of claim 12, further comprising one or more laminarizers in the plurality of channels configured to laminarize the fluid flow.

24. Logic encoded in one or more tangible media for execution and when executed operable to:
  measure a first vortex shedding and/or passing frequency of a first Kármán vortex street in a fluid flow; and
  measure a second vortex shedding and/or passing frequency of a second Kármán vortex street in the fluid flow.

25. The logic of claim 24, further comprising logic configured to:
  select one or more of a highest usable frequency and a best response time between the first or second vortex shedding and/or passing frequencies; and
  compute the volumetric flow of the fluid flow based on the highest usable frequency and/or the best response time.

26. The logic of claim 24, further comprising logic configured to:
  measure one or more environmental variables; and
  compute the mass flow of the fluid flow based on the highest usable frequency and/or the best response time, and the one or more of environmental variables.

27. The logic of claim 24, wherein the logic configured to measure the first vortex shedding and/or passing frequency comprises logic configured to measure the first vortex shedding and/or passing frequency in a first channel of known cross-sectional area and the logic configured to measure the second vortex shedding and/or passing frequency comprises logic configured to measure the second vortex shedding and/or passing frequency in a second channel of unknown cross-sectional area, and further comprising logic configured to compute the cross-sectional area of the second channel based on the first and second vortex shedding and/or passing frequencies.

28. The logic of claim 24, further comprising logic configured to:
  cross-check the first vortex shedding and/or passing frequency with the second vortex shedding and/or passing frequency; and
  determine if a failure is present based on the cross-check of the first and second vortex shedding and/or passing frequencies.

29. The method of claim 1, further comprising:
  differing flow velocity and/or a Reynolds number past one or more bluff bodies in order to sense the fluid flow across the plurality of channels.

30. The method of claim 1, further comprising:
  differing vortex-shedding and/or vortex-passing frequency past one or more bluff bodies in order to sense the flow across the plurality of channels.

31. The method of claim 1, further comprising:
  using one or more bypass channels in parallel configured to pass part of the fluid flow through a sensing channel to extend the range of a sensed fluid flow across the plurality of channels.

32. The logic of claim 24, wherein the fluid flow has been converged or diverged prior to measuring the first and/or second vortex shedding and/or passing frequency, wherein the Reynolds number or flow velocity of the fluid flow is different from the Reynolds number or flow velocity of the converged or diverged fluid flow.

* * * * *